(12) United States Patent
Cole et al.

(10) Patent No.: US 12,162,483 B2
(45) Date of Patent: Dec. 10, 2024

(54) VEHICLE WHEEL LOCATION AND PATH DETERMINATION

(71) Applicants: Colin M Cole, Oxford, MI (US); Aleksander M Tonkovich, Keego Harbor, MI (US)

(72) Inventors: Colin M Cole, Oxford, MI (US); Aleksander M Tonkovich, Keego Harbor, MI (US)

(73) Assignee: FCA US LLC, Auburn Hills, MI (US)

( * ) Notice: Subject to any disclaimer, the term of this patent is extended or adjusted under 35 U.S.C. 154(b) by 409 days.

(21) Appl. No.: 17/517,864

(22) Filed: Nov. 3, 2021

(65) Prior Publication Data

US 2023/0136633 A1     May 4, 2023

(51) Int. Cl.
| | |
|---|---|
| *B60W 40/06* | (2012.01) |
| *B60R 1/00* | (2022.01) |
| *B60W 30/10* | (2006.01) |
| *B60W 30/18* | (2012.01) |
| *B60W 40/13* | (2012.01) |
| *B62D 15/02* | (2006.01) |
| *G06T 11/60* | (2006.01) |

(52) U.S. Cl.
CPC ............ *B60W 30/10* (2013.01); *B60W 40/13* (2013.01); *B62D 15/021* (2013.01); *B60W 2040/1315* (2013.01); *B60W 2420/403* (2013.01); *B60W 2510/22* (2013.01)

(58) Field of Classification Search
None
See application file for complete search history.

(56) References Cited

U.S. PATENT DOCUMENTS

| | | | |
|---|---|---|---|
| 8,996,249 B2 | 3/2015 | Lu et al. | |
| 9,555,824 B2 | 1/2017 | Preijert | |
| 2005/0098964 A1* | 5/2005 | Brown | ..................... B60G 3/06 280/5.5 |
| 2016/0325753 A1 | 11/2016 | Stein et al. | |
| 2019/0031101 A1* | 1/2019 | Yousefian | ............... G06T 11/60 |
| 2020/0198624 A1* | 6/2020 | Akatsuka | .............. B60W 10/18 |

* cited by examiner

*Primary Examiner* — Jonathan M Dager
*Assistant Examiner* — Laura E Linhardt
(74) *Attorney, Agent, or Firm* — Jeremy J. Klobucar

(57) ABSTRACT

A vehicle includes a body including suspension components, multiple wheels coupled to the body, a suspension sensor coupled to one of the suspension components or at least one of said multiple wheels, a camera, a display connected to the camera to display at least part of the camera view, a processor receiving inputs from the suspension sensor, and memory coupled to the processor. The memory includes a program from which an actual horizontal wheel position relative to a path of travel of the vehicle is determined as a function of a vertical position of the at least one of said multiple wheels. And the processor causes an image representative of the actual horizontal wheel position to appear on the display, and wherein vertical is in the direction of gravity and horizontal is perpendicular to the direction of gravity.

19 Claims, 5 Drawing Sheets

VEHICLE WHEEL LOCATION AND PATH DETERMINATION

FIELD

The present disclosure relates to a system to determine and display the location and path of one or more vehicle wheels.

BACKGROUND

Many vehicles today include a camera that provides to a display within a passenger compartment of the vehicle an image of the area in which the vehicle is located. Some cameras are used when the vehicle is traveling in reverse to show the area behind the vehicle, and may show a path of the vehicle that changes as the steering wheel is rotated to change the desired steering angle of the vehicle. Some vehicles also include obstacle detectors that provide a warning if the vehicle is approaching and may strike an obstacle that is within the projected path of the vehicle. However, due to, for example, uneven terrain or vehicle body roll, the actual location of the vehicle wheels and thus, the actual path to be taken by the wheels can vary from a nominal position and nominal wheel path.

SUMMARY

In at least some implementations, a vehicle includes a vehicle body including suspension components, multiple wheels coupled to the vehicle body by the suspension components, a suspension sensor coupled to one of the suspension components or at least one of said multiple wheels, a camera carried by the vehicle body, a display carried by the vehicle body and connected to the camera to display at least part of the camera view, a processor receiving input from the suspension sensor, and memory coupled to the processor. The memory includes a program from which an actual horizontal wheel position is determined as a function of a vertical position of the at least one of said multiple wheels. And the processor causes an image representative of the actual horizontal wheel position to appear on the display, and wherein vertical is in the direction of gravity and horizontal is perpendicular to the direction of gravity.

In at least some implementations, the suspension sensor is a ride height sensor coupled to at least one of the suspension components and responsive to vertical movement of the at least one of the suspension components.

In at least some implementations, the program causes the processor to the display an image representative of the position of two horizontally spaced apart wheels of said multiple wheels, and wherein the suspension components comprise an independent suspension for each of said two horizontally spaced apart wheels.

In at least some implementations, the program causes the processor to the display an image representative of the position of two horizontally spaced apart wheels of said multiple wheels, and wherein the suspension components include an axle to which each of said two horizontally spaced apart wheels is coupled. In at least some implementations, the suspension sensor is responsive to movement of the axle caused by movement of the wheels coupled to the axle, and wherein the actual horizontal position of the wheels coupled to the axle is determined as a function of the vertical position of the axle and of an angle of axle indicative of the vertical position of the wheels coupled to the axle.

In at least some implementations, the vehicle includes a steering sensor coupled to a steerable component of the vehicle and coupled to the processor to provide a signal indicative of a steering angle, and the program causes the processor to display a projected path of travel of the vehicle that is based upon the actual horizontal wheel position. In at least some implementations, the projected path is determined as a function of both the actual horizontal wheel position and the steering angle of the at least one of said multiple wheels. In at least some implementations, the projected path is determined as a function of a difference between the steering angle and the angle of the at least one of said multiple wheels determined by the program as a function of the vertical position of the at least one of said multiple wheels.

In at least some implementations, the suspension sensor is a first suspension sensor responsive to movement of a first one of the suspension components that is associated with a first wheel of the multiple wheels, and wherein the vehicle includes a second suspension sensor that is coupled to a second one of the suspension components that is associated with a second wheel of the multiple wheels that is horizontally spaced apart from the first wheel, and wherein the program causes the processor to the display an image representative of the position of both the first wheel and the second wheel based at least in part upon the actual horizontal position of the first wheel and second wheel. In at least some implementations, the camera is a forward facing camera having a view of the terrain to be traversed by the vehicle when traveling in a forward direction, and wherein the first wheel and second wheel are front wheels of the vehicle. In at least some implementations, the camera is a rearward facing camera having a view of the terrain to be traversed by the vehicle when traveling in a reverse direction, and wherein the first wheel and second wheel are rear wheels of the vehicle.

In at least some implementations, a method of determining wheel position in a vehicle, comprises the steps of:
a) determining at least one of a height of: 1) a suspension component associated with at least one wheel of the vehicle, or 2) the at least one wheel of the vehicle;
b) determining the horizontal position of the at least one wheel as a function of the height;
c) determining a steering angle of the vehicle;
d) calculating a path of the vehicle as a function of the steering angle and either a) the horizontal position of the at least one wheel or 2) the height determined in step a); and
e) displaying the horizontal position of at least one wheel, or the wheel path or both.

In at least some implementations, the vehicle has a pair of front wheels and a pair of rear wheels, and step a) is accomplished by determining a height of suspension components associated with at least one of: a) both front wheels of the vehicle; or b) both rear wheels of the vehicle. In at least some implementations, the height is the height associated with both front wheels.

In at least some implementations, step e) is accomplished by displaying a symbol on a display of the vehicle, with the symbol located in a position indicative of the actual position of the at least one wheel.

In at least some implementations, step a) is accomplished with a suspension sensor that is responsive to changes in the position of a suspension component. In at least some implementations, step a) is accomplished with a first suspension sensor responsive to changes in position of a first front wheel of the vehicle and with a second suspension sensor responsive to changes in position of a second front wheel of the vehicle. In at least some implementations, the first front wheel and second front wheel are coupled to a solid axle. In at least some implementations, the first front wheel and second front wheel are coupled to a body of the vehicle by independent suspension assemblies.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
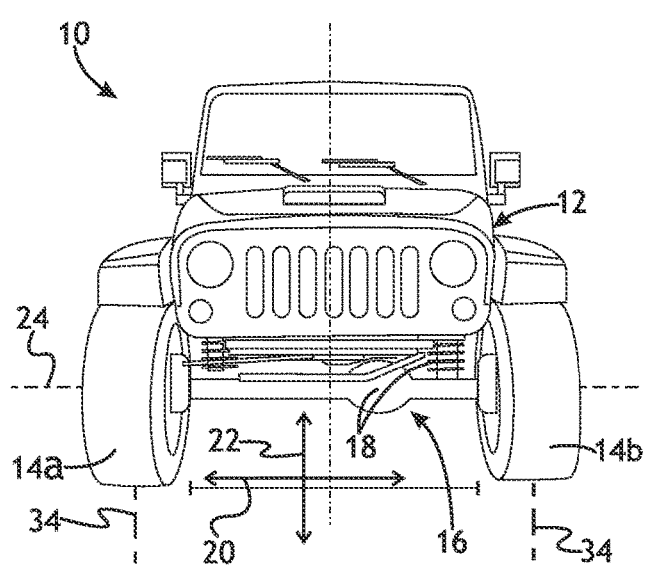
FIG. 1 is a front view of a vehicle shown at a nominal ride height.

Referring in more detail to the drawings, FIG. 1 illustrates the front of a vehicle 10 having a body 12 and multiple wheels 14a, 14b coupled to the body 12 by a vehicle suspension 16 having various suspension components 18 as is known. Two front wheels 14a, 14b are shown in FIG. 1 and they are spaced apart horizontally, sometimes called a cross-car direction, extending between driver and passenger sides of the vehicle 10, and shown by arrow 20. The front of the vehicle 10 leads the rear of the vehicle 10 in a fore-aft direction extending into the page in FIG. 1, and the body 12 is suspended off a ground surface by the wheels 14a, 14b and vehicle suspension 16, in a vertical direction shown by arrow 22, which is parallel to the direction of gravity when the vehicle 10 is on a flat, level road oriented perpendicular to gravity. As the vehicle 10 moves, the wheels 14a, 14b rotate about a horizontal axis 24.

Figure 10:
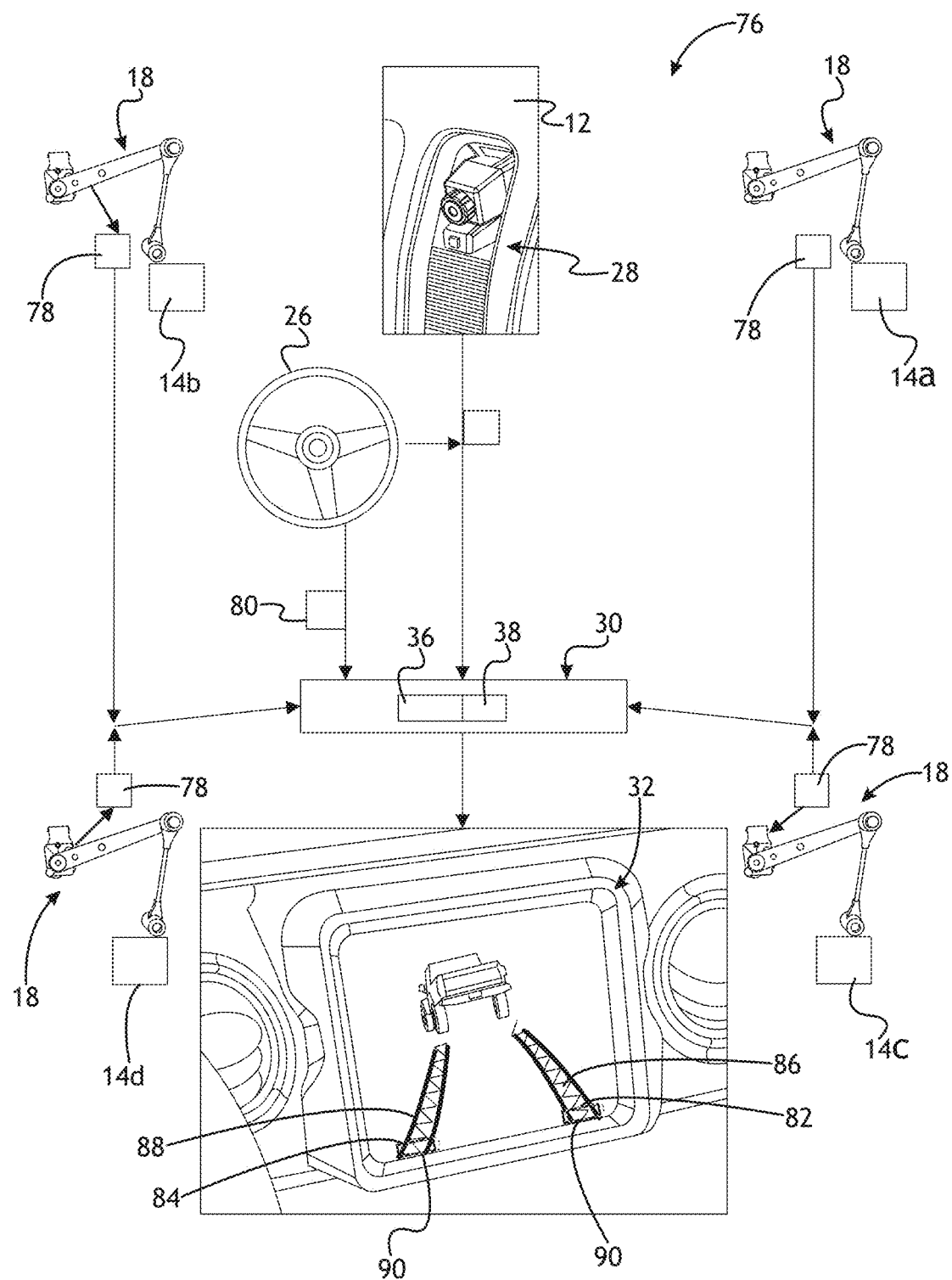
FIG. 10 is a schematic view of a system including multiple suspension components for multiple vehicle wheels, a steering component, a camera, a processor with memory and a display.

As shown in FIG. 10, the vehicle 10 may also include a steering input, such as a steering wheel 26, a camera 28, a controller 30, and a display 32. The steering input is any device by which a driver may command a change in the steering angle of the wheels 14a, 14b to turn the vehicle 10. The steering angle changes as the wheels 14a, 14b are rotated about a vertical axis 34 (FIG. 1).

The camera 28 is carried by the vehicle body 12 and has a lens with a viewing angle that includes an area to be traversed by the vehicle 10. When the vehicle 10 is moving in the forward direction, a forward facing camera 28 can be used to view, sense or display the terrain in front of the vehicle 10. When the vehicle 10 is moving in reverse, that is in the rearward direction, a rearward facing camera 28 can be used to view, sense or display the terrain at the rear or behind the vehicle 10. So the vehicle 10 may have one or more cameras, as desired, to show one or more areas of the environment in which the vehicle 10 is located.

The display 32 may be carried by the vehicle body 12, such as within a passenger compartment of the vehicle 10, and may be coupled to the camera 28 to provide a view of the area to be traversed by the vehicle 10. The camera 28 and display 32 may be coupled to the controller 30 which may include a processor 36 and memory 38 that includes executable programs or instructions. The display 32, processor 36 and memory 38 may be of suitable types and such components in vehicles are well-known and will not be further described herein. By way of examples, without limitation, the display may be an LED or OLED screen, the processor may be any desired type of microprocessor and the memory may be integrated with the microprocessor or separate from it, a reprogrammable or flash EEPROM (electrically erasable, programmable read-only memory), RAM (random access memory), ROM (read-only memory), EPROM (erasable, programmable read-only memory), or any other suitable non-transitory computer readable medium.

Figure 2:
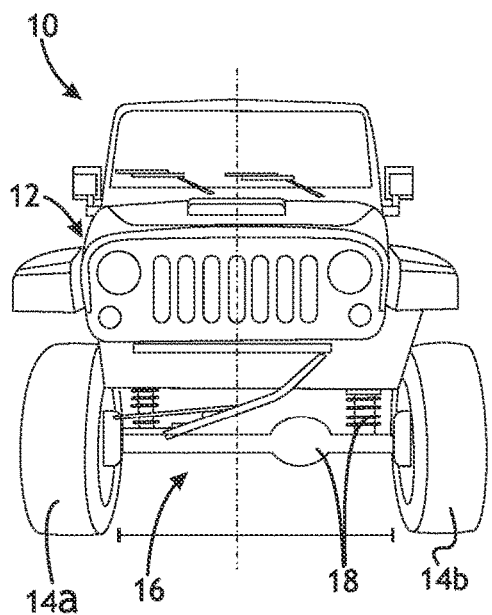
FIG. 2 is a front view of the vehicle shown with the wheels and suspension in an extending position relative to a body of the vehicle.

FIG. 2 illustrates the same vehicle 10 as in FIG. 1 but with the vehicle suspension 16 in an extended state, sometimes called suspension droop or rebound, which occurs when the vehicle 10 travels over a portion of the road lower than a previously traveled portion. In the example shown, both wheels 14a, 14b are lowered the same extent such as occurs when the vertical drop or dip in the road is level horizontally. In this position, the wheels 14a, 14b have extended away from the vehicle body 12 as permitted by movement of the suspension components 18, such as springs, shocks, and various linkages, for those wheels 14a, 14b.

In the example of FIGS. 1, 2 and 5-8, the vehicle suspension 16 includes a so-called solid axle 40 with the wheels 14a, 14b coupled to opposite ends of the axle 40 in known manner. The suspension 16 moves from a nominal position, shown in FIG. 1, to the extended position shown in FIG. 2 about a pivot or attachment point that causes horizontal displacement of the axle 40 and wheels 14a, 14b. Thus, the wheels 14a, 14b move laterally as the suspension 16 and wheels 14a, 14b move vertically due to vertical changes in the surface on which the vehicle 10 is traveling. In the example shown, the wheels 14a, 14b shift horizontally to the right (as shown in FIG. 1) as the suspension 16 extends away from the vehicle 10, as can be seen by comparison of the horizontal position of the wheels 14a, 14b relative to the vehicle body 12 in FIG. 2 as compared to the horizontal wheel position in FIG. 1. Further, the wheels 14a, 14b shift horizontally to the left (as viewed in FIG. 2) as the suspension 16 moves in the opposite direction, toward the vehicle body 12 and toward a compressed or retracted position.

Figure 3:
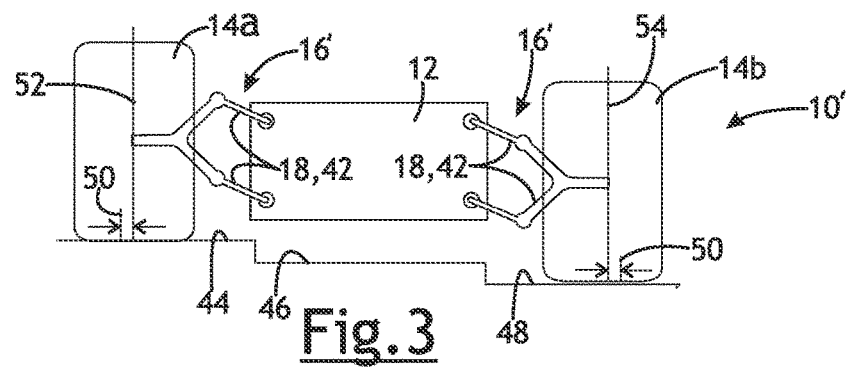
FIG. 3 is a diagrammatic view of two wheels of a vehicle coupled to a body by independent suspension components, and with the two wheels on surfaces at different heights.

FIG. 3 illustrates part of a vehicle 10' having a different suspension 16' which is a so-called independent suspension arrangement in which separate linkages 42 connect the wheels 14a, 14b to the vehicle body 12. That is, the linkages/suspension 42 of one wheel 14a is independent of the other wheel(s) 14b. In FIG. 3, the wheel 14a on the left is on an elevated surface 44 compared to a nominal, flat and level surface 46, and the wheel 14b on the right is on a lower surface 48 compared to the flat and level surface 46. Lines 50 show the centerline of the wheels 14a, 14b when both wheels 14a, 14b are on the flat and level surface 46 (e.g. at the same vertical level) and when the vehicle 10' is at a nominal ride height, that is, the suspension 16' is in the position or height at which it is when the vehicle 10' is at rest. A line 52 shows the centerline of the left wheel 14a and indicates that, in this suspension arrangement, the left wheel 14a shifted to the right as it was raised relative to the vehicle body 12. A line 54 shows the centerline of the right wheel 14b and indicates that, in this suspension arrangement, the right wheel 14b shifted to the left as it was lowered relative to the vehicle body 12.

Figure 4:
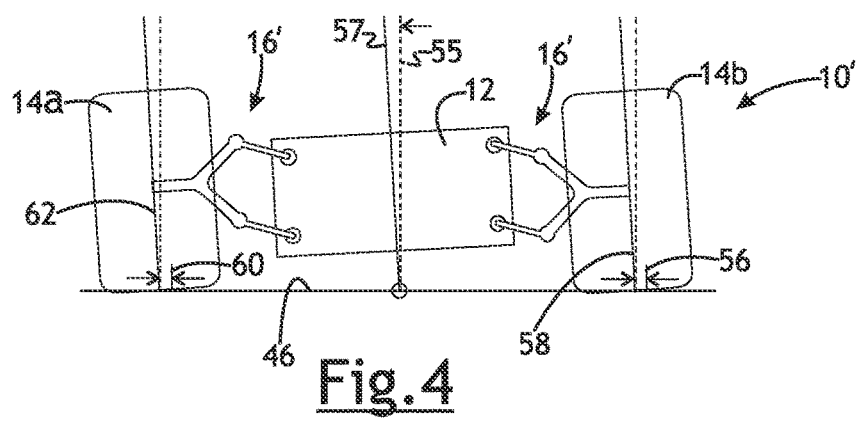
FIG. 4 is a view similar to FIG. 3 illustrating position of the wheels due to vehicle body roll.

FIG. 4 shows the vehicle 10' of FIG. 3 with the wheels 14a, 14b on a flat and level surface, so the wheels 14a, 14b are at the same vertical height, but the vehicle body 12 has rolled or rotated a bit counterclockwise. Line 55 is the centerline of the vehicle body 12 without body roll, and line 47 shows the body centerline with the body roll. Lines 56 and 58 show the centerline of the right wheel 14b without the body roll and with, respectively, and indicate that this direction of body roll causes the right wheel 14b to shift to the left. Lines 60 and 62 show the centerline of the left wheel 14a without the body roll and with, respectively, and indicate that this direction of body roll causes the left wheel 14a to shift to the left. Body roll in the opposite direction would cause the wheels 14a, 14b to shift to the right.

Figure 5:
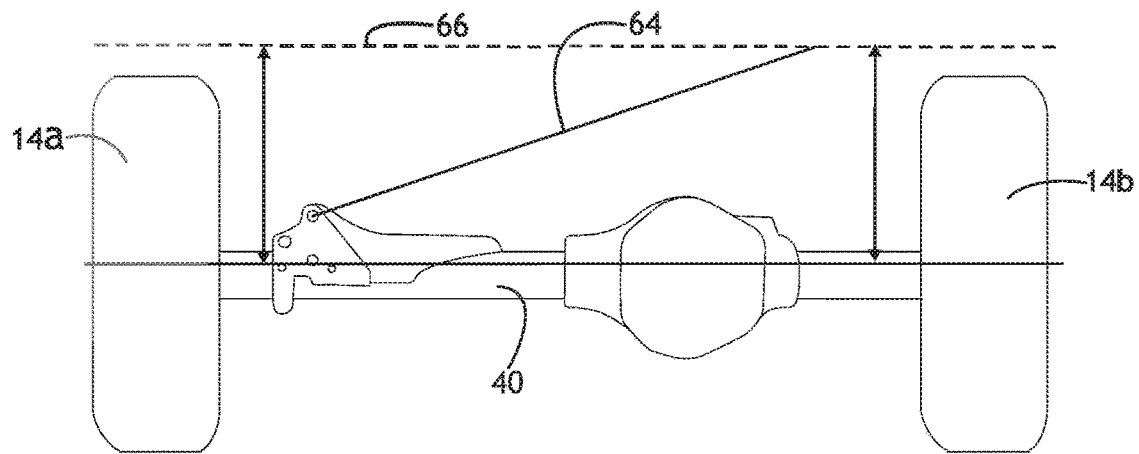
FIG. 5 is a view of vehicle wheels coupled by an axle with the wheels shown on a surface wherein the wheels are at the same level and at a nominal ride height.
Figure 6:
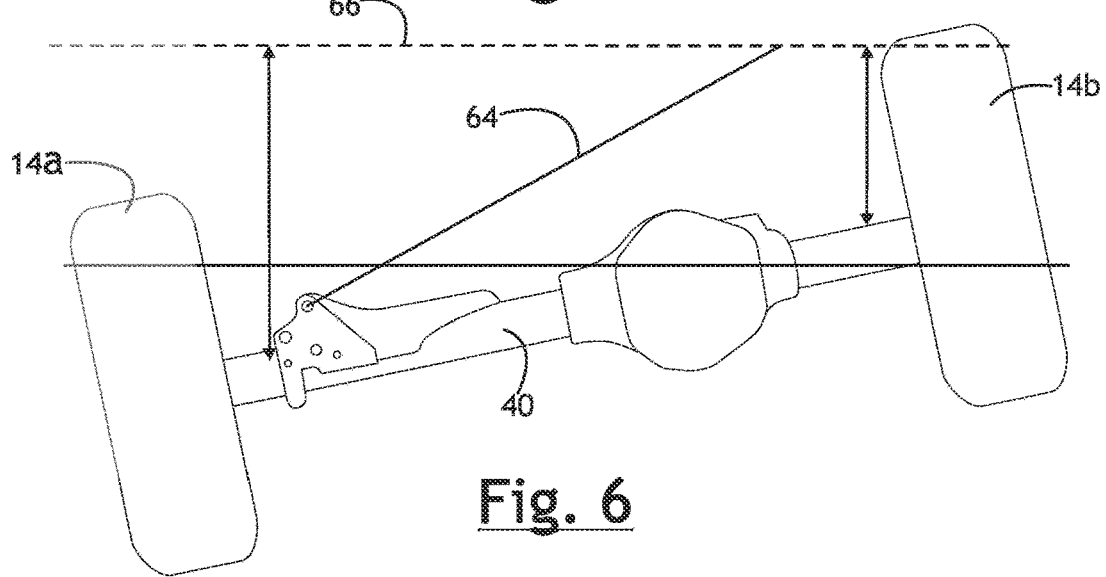
FIG. 6 is a view similar to FIG. 5 and showing the wheels on surfaces of different heights.
Figure 7:
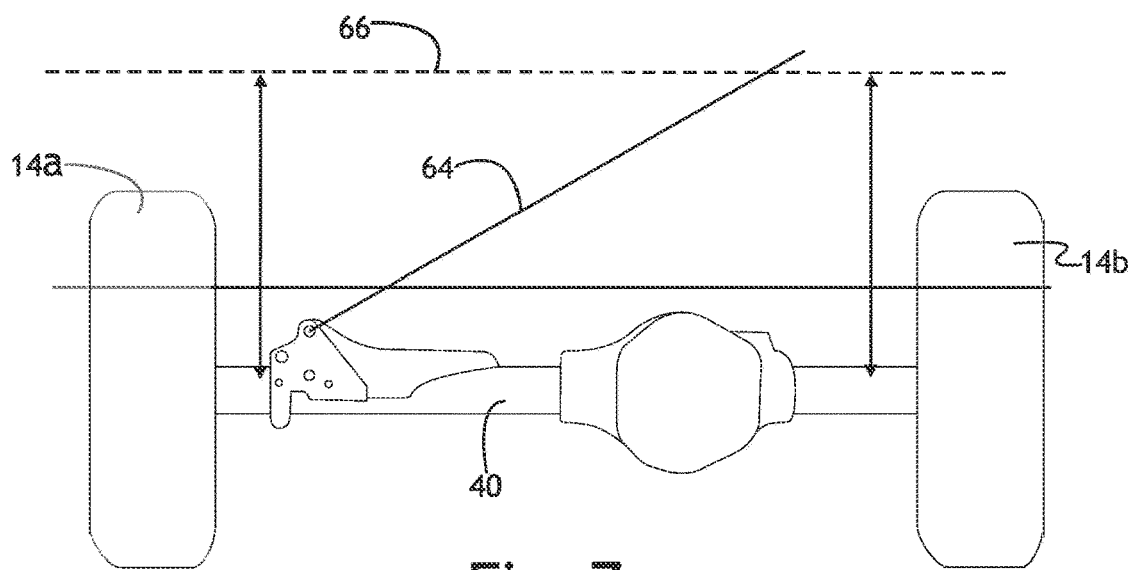
FIG. 7 is a view similar to FIG. 5 and showing the wheels at the same height but with the suspension in an extended position.

FIGS. 5-7 illustrate the front wheels 14a, 14b and axle 40 of the vehicle 10 of FIGS. 1 and 2, which includes a track bar 64 coupled at one end to the axle 40 and at its opposite end to the vehicle body 12 (as best shown in FIGS. 1 and 2). A line 66 represents a surface of the vehicle 10 and/or a horizontal reference. In FIG. 5, the axle 40 is at the nominal vertical height and the wheels 14a, 14b are on a flat and level surface, which is the position of the vehicle 10 shown in FIG. 1.

In FIG. 6, the wheels 14a, 14b are on an inclined surface wherein the left wheel 14a is vertically lower than the right wheel 14b, and the axle 40 is inclined relative to the vehicle body 12 (e.g. line 66). In this example, the right wheel 14b has moved upward relative to the vehicle body 12 (e.g. up farther in a corresponding wheel well) and the left wheel 14a has moved away from the vehicle body 12. The track bar 64 and/or other suspension components 18 constrain movement of the axle 40 and wheels 14a, 14b and the wheels 14a, 14b shift to the right (as viewed in FIG. 6) compared to the position of the wheels 14a, 14b in FIG. 5. When the opposite wheel displacement occurs (i.e. the right wheel 14b lower than the left wheel 14a) the wheels 14a, 14b will shift to the left.

In FIG. 7, the right and left wheels 14a, 14b are vertically at the same level but have moved away from the vehicle body 12, which is a position of the vehicle 10 like that shown in FIG. 2. The track bar 64 and/or other suspension components 18 constrain movement of the axle 40 and wheels 14a, 14b and the wheels 14a, 14b shift to the right (as viewed in FIG. 7) compared to the position of the wheels 14a, 14b in FIG. 5. When the opposite wheel displacement occurs (i.e. the wheels 14a, 14b move toward the vehicle body 12 compared to the nominal position) the wheels 14a, 14b will shift to the left.

Figure 8:
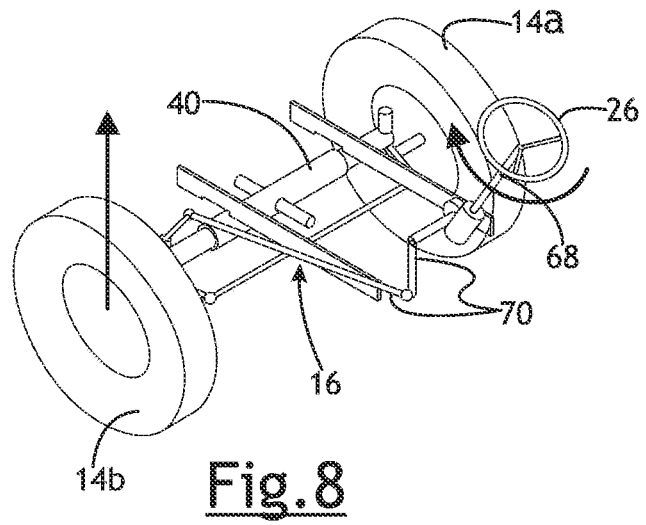
FIG. 8 is an illustration of a bump steer effect on a vehicle including a solid axle.

In FIG. 8, two wheels 14a, 14b and a solid axle suspension 16 arrangement are again shown, as is a steering assembly including a steering wheel 26, steering shaft 68 and steering linkages 70 by which the steering angle of the wheels 14a, 14b may be changed. Because the steering assembly is coupled to the wheels 14a, 14b, as the wheels 14a, 14b shift vertically, the steering linkages 70 are displaced and this causes a change in the steering angle of the wheels 14a, 14b. That is, the wheel movement causes a change in steering angle that is not commanded by a driver rotating the steering wheel 26. This is sometimes called "bump steer."

Figure 9:
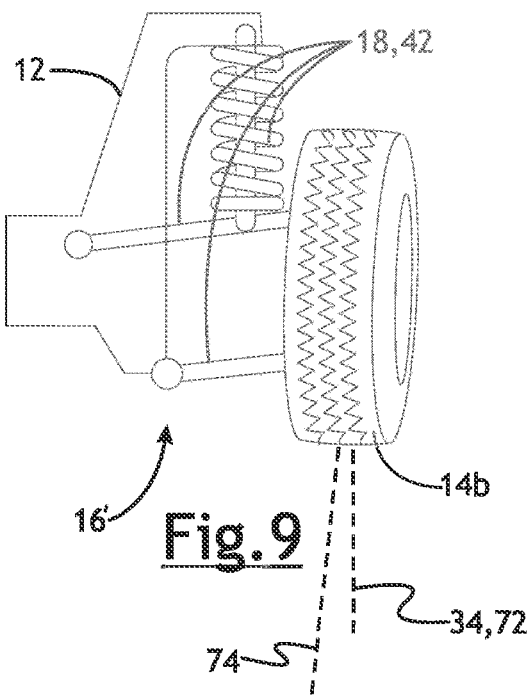
FIG. 9 is an illustration of wheel angle change with a wheel coupled to a vehicle body by an independent suspension that is shown in a retracted or compressed position.

Further, in FIG. 9, a wheel 14b coupled to a vehicle body 12 by an independent suspension 16' is shown. In the position shown in FIG. 9, the wheel 14b is vertically raised toward the vehicle body 12 relative to a nominal vertical position of the wheel 14b. This causes a compression or retraction of the suspension components 18 which rotate the wheel 14b about the vertical axis 34, causing a change in the angle of the wheel 14b relative to the intended direction of travel. This is an example of another condition in which the angle of the wheel 14b may differ from a driver commanded angle of the wheel, and is sometimes referred to as a change in the toe angle of the wheel and is illustrated by line 72 which shows the intended angle of the wheel and line 74 which shows the angle of the wheel caused by the vertical displacement of the wheel in FIG. 9.

Thus, vertical movement of the suspension 16, 16' and wheels 14a, 14b in a vehicle 10, 10' and/or vehicle body roll, cause horizontal displacement of the wheels 14a, 14b and may also cause changes to the angle of the wheels 14a, 14b relative to the intended direction of vehicle travel. These changes to the wheel's horizontal position and angle can be important in different operating conditions, such as when a vehicle 10 is navigating obstacles which is common in off-road travel, that is, travel on unpaved roads. Knowledge of the actual horizontal position and or angle of one or more wheels 14a, 14b may help a driver adequately navigate an obstacle.

Accordingly, a system and method are provided to determine and provide a display of an actual wheel position and angle (e.g. projected wheel path based upon wheel position and angle). A representative system 76 is shown in FIG. 10. This system 76 includes multiple wheels 14a, 14b, 14c, 14d (where wheels 14c, 14d are rear wheels of the vehicle 10) that are connected to the vehicle body 12 by suspension components 18. A suspension sensor 78 is associated with at least one and up to each wheel 14a, 14b, 14c, 14d and may be carried by a suspension component 18, a wheel 14a, 14b, 14c, 14d or the vehicle body 12. The suspension sensors 78 are coupled to and provide an input signal to the controller 30 to provide an indication of the vertical position of the wheels 14a, 14b, 14c, 14d. While multiple suspension sensors 78 are shown in FIG. 10, specifically one suspension sensor 78 for each wheel 14a, 14b, 14c, 14d of a vehicle 10 (shown as having four wheels 14a, 14b, 14c, 14d, but the vehicle may have a different number of wheels), fewer suspension sensors 78 including only one suspension sensor 78 might be used. For example, in a solid axle suspension 16 the angle of the axle 40 may be used to determine the vertical wheel position(s) and this might be determined with a single suspension sensor 78 If determination of wheel position and angle is desired for both forward and rearward travel, then a suspension sensor 78 might be used for both front and rear axles. So the system includes at least one suspension sensor 78 that is used to determine the vertical height of at least one wheel 14a, 14b, 14c, 14d.

As noted above, the system 76 also includes a steering assembly including a steering wheel 26, and a steering sensor 80 that determines an intended steering angle for the vehicle 10. The steering sensor 80 is coupled to any desired component of the steering assembly and also to the controller 30 to provide a steering angle input to the controller 30.

So the controller 30 has inputs from both the suspension sensor(s) 78 and steering sensor(s) 80 which provide information regarding vehicle ride height and intended steering angle, and from that information, the controller 30 determines the horizontal position of one or more wheels 14a, 14b and the steering angle for one or more wheels 14a, 14b. The controller 30 can then cause the display 32 to, based on these inputs, show an image of one or both the actual horizontal wheel position and the path that one or more wheels 14a, 14b will take with continued travel under the current conditions. This may be shown on the display 32 as one or more graphics overlaid on an image provided by the camera 28. For example, as shown in FIG. 10, when the vehicle 10 is traveling forward, the view captured by a forward facing camera 28 may be shown on the display 32, and one or more of: 1) a first graphic 82 may be shown on the display 32 that is indicative of the actual horizontal position of a front left wheel 14a; 2) a second graphic 84 may be shown on the display 32 that is indicative of the actual horizontal position of a front right wheel 14b; 3) a third graphic 86 may be shown on the display 32 that is indicative of the forward path of the front left wheel 14a; and 4) a fourth graphic 88 may be shown on the display 32 that is indicative of the forward path of the front right wheel 14b. In at least some implementations, instead of the first and second graphics 82, 84, the actual horizontal positions of the left and right front wheels 14a, 14b may be illustrated on the display 32 by a portion of the paths that is, a portion of the third and fourth graphics 86, 88, for example, a beginning or proximal end 90 of the third and fourth graphics 86, 88. In at least some implementations, the first and second graphics 82, 84 may be discrete polygons like rectangles indicating the contact patch for each wheel 14a, 14b which is the portion of the wheel actually engaged with the ground, and the third and fourth graphics 86, 88 may be elongated straight or curved lines or polygons laid out along the camera view. Further, as shown in FIG. 3, a horizontal shift of the wheels 14a and 14b (shown by comparison of lines 50, 52 and 54) occurs upon movement of associated suspension components 16' and resulting vertical displacement of the wheels 14a, 14b. In FIG. 10, the horizontal shift of the wheels 14a, 14b, on ground as represented in FIG. 3, is shown by polygons 82, 84 drawn with solid lines in one position and by polygons drawn with broken/dashed lines in the other position so that, in either position, the graphics 82 and 84 on display 32 in FIG. 10 show the actual horizontal position of the wheels 14a, 14b relative to the ground shown on the display 32.

Figure 11:
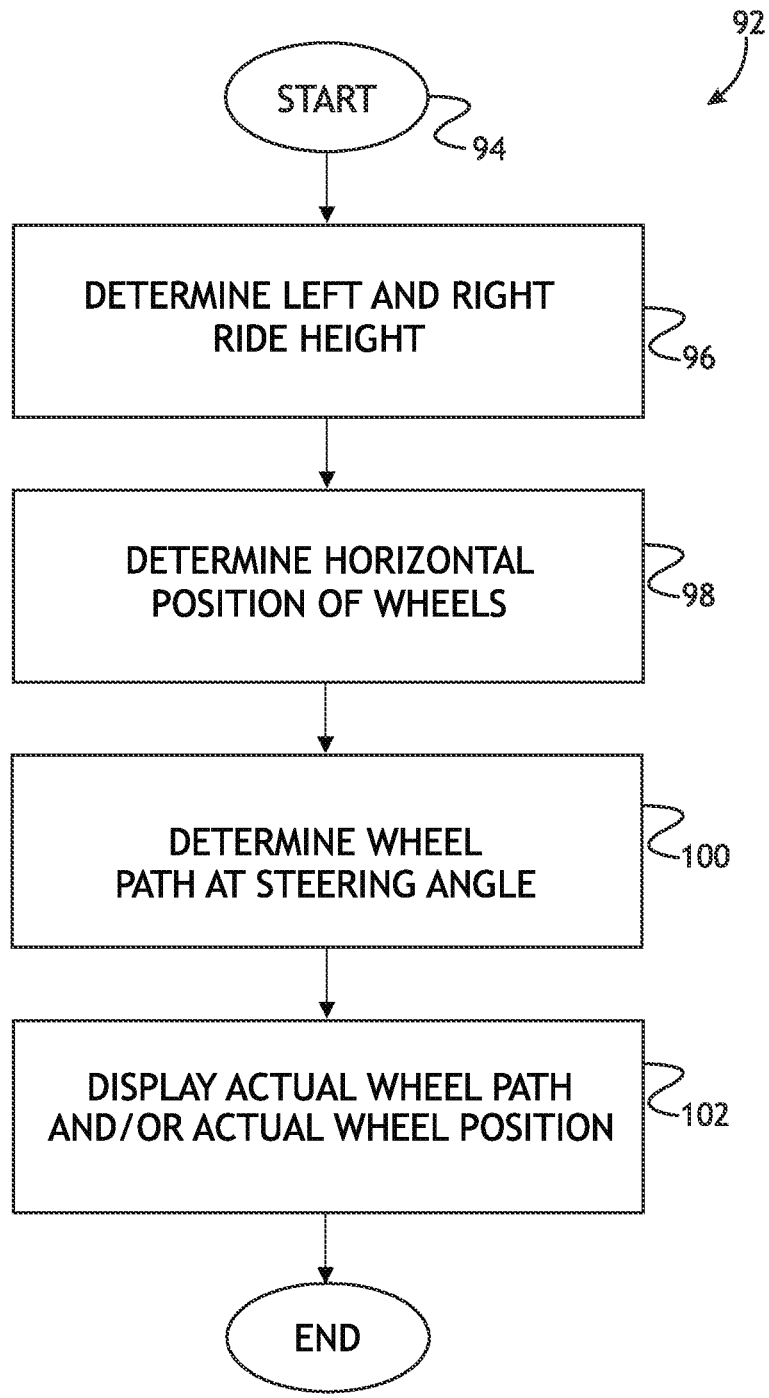
FIG. 11 is a flowchart of a method for determining wheel position and wheel path as a function of steering angle and suspension position.

The controller 30 may utilize a method for determining wheel position and angle, such as the method 92 set forth in FIG. 11. The method 92 starts at step 94 and in step 96 at least one ride height is determined. The ride height might be the relative position of a suspension component 18 or wheel 14, 14b, for example, relative to a nominal or at rest position of such component. In the example method of FIG. 11, a left and right side ride height is determined. When the vehicle 10 is traveling forward, the ride height relative to the front wheels 14a, 14b of the vehicle 10 may be determined. The ride height of the rear wheels 14c, 14d may be determined as well, if desired for example, to determine body roll fore/aft and/or horizontal/cross-car roll, and/or when the vehicle 10 is traveling in reverse and a rear camera 28 is providing an image of the terrain over which the vehicle 10 is moving. The ride height may be altered due, fore example, to an uneven road or vehicle body roll.

From the ride height determination, the controller 30 may determine in step 98 a horizontal position of one or more vehicle wheels 14a, 14b. As discussed above, this determination can be made by the controller 30 executing a program that includes data about the suspension 16 of the vehicle 10. In view of the geometries and arrangement of the suspension components 18, the horizontal offset of the wheels 14a, 14b, if any, due to ride height changes from a nominal ride height can be determined. This can be calculated mathematically and/or determined empirically through testing of a vehicle, or a combination of both, as desired.

Next, in step 100, the steering angle is determined and a wheel path is determined based upon both the steering angle and the ride height information and/or actual horizontal wheel position as determined in step 98. As discussed above, the steering angle may be an actual or approximated/determined wheel angle, or an angle of a component in the steering assembly such as, but not limited to, the steering column or steering rack. The wheel path determined in step 100 is the wheel path the wheels 14a, 14b will actually take based upon the current suspension position/ride height of the vehicle 10, and not a nominal wheel path based only on the steering angle. The system may determine a bump steer effect, among other things, that may affect the steering angle as the vehicle 10 travels over uneven terrain.

Finally, one or both of the wheel path and actual horizontal wheel position is communicated to the driver, such as by displaying information on the vehicle display 32 in step 102. The information may be provided in the form of graphics 82, 84, 86, 88 overlaid on an image provided from the camera 28. In the example of FIG. 10, the actual wheel position is shown on the display 32 by separate symbols or graphics 82, 84, shown as rectangles in this example, arranged on the display 32 and relative to an actual image or live feed from the camera 28 so a driver can see the actual wheel position relative to the terrain over which the vehicle 10 is traveling. The wheel path may be provided by graphics 86, 88 such as curved lines or polygons that represent the determined tire position along the currently steered path of the vehicle 10, taking into account both ride height/suspension data and the steering angle. As noted above, the wheel position may be indicated by a portion of the wheel path graphics 86, 88 instead of by separate symbols, such as by a proximal end 90 of the path nearest to the vehicle 10, or by a portion of the path provided in a different color or otherwise distinguishable from the remainder of the path. Further, a symbol having the appearance of a wheel may be used to represent the wheel for improved visualization of the wheel position and orientation by the driver.

Thus, instead of displaying to the driver a nominal wheel position or nominal projected path of the wheels 14a, 14b that is based upon steering angle but not suspension position or wheel height, the system can provide a more accurate information to a driver to help the driver better navigate uneven terrain and obstacles like rocks, stumps, holes, ruts, and the like, in the vehicle's path. The system is responsive to both ride height and steering angle and may provide instantaneous or real-time display of the wheel position and/or wheel path as the steering angle and/or ride height data changes while the vehicle 10 moves.

What is claimed is:

1. A vehicle, comprising:
   a vehicle body including suspension components;
   multiple wheels coupled to the vehicle body by the suspension components;
   a suspension sensor coupled to one of the suspension components or at least one of said multiple wheels;
   a camera carried by the vehicle body;
   a display carried by the vehicle body and connected to the camera to display at least part of the camera view;
   a processor receiving input from the suspension sensor; and
   memory coupled to the processor and including a program from which an actual horizontal wheel position is determined as a function of a vertical position of the at least one of said multiple wheels, wherein the actual horizontal wheel position changes with movement of at least one of the suspension components relative to the vehicle body and resulting changes in the vertical position of the at least one of said multiple wheels relative to the vehicle body, wherein the processor causes an image representative of the actual horizontal wheel position to appear on the display, and wherein vertical is in the direction of gravity and horizontal is perpendicular to the direction of gravity.

2. The vehicle of claim 1 wherein the suspension sensor is a ride height sensor coupled to at least one of the suspension components and responsive to vertical movement of the at least one of the suspension components.

3. The vehicle of claim 1 wherein the program causes the processor to provide on the display at least a graphic representation of the position of two horizontally spaced apart wheels of said multiple wheels, and wherein the suspension components comprise an independent suspension for each of said two horizontally spaced apart wheels.

4. The vehicle of claim 1 wherein the program causes the processor to provide on the display a graphic representation of the position of two horizontally spaced apart wheels of said multiple wheels, and wherein the suspension components include an axle to which each of said two horizontally spaced apart wheels is coupled.

5. The vehicle of claim 1 which also includes a steering sensor coupled to a portion of a steering assembly of the vehicle and coupled to the processor to provide a signal indicative of a steering angle, and wherein the program causes the processor to provide on the display a projected wheel path that is based in part upon the actual horizontal wheel position.

6. The vehicle of claim 5 wherein the projected wheel path is determined as a function of both the actual horizontal wheel position and the vertical position of the at least one of said multiple wheels.

7. A vehicle, comprising:
   a vehicle body including suspension components;
   multiple wheels coupled to the vehicle body by the suspension components;
   a suspension sensor coupled to one of the suspension components or at least one of said multiple wheels;
   a camera carried by the vehicle body;
   a display carried by the vehicle body and connected to the camera to display at least part of the camera view;
   a processor receiving input from the suspension sensor;
   a steering sensor coupled to a portion of a steering assembly of the vehicle and coupled to the processor to provide a signal indicative of a steering angle; and
   memory coupled to the processor and including a program from which an actual horizontal wheel position is determined as a function of a vertical position of the at least one of said multiple wheels, wherein the processor causes an image representative of the actual horizontal wheel position to appear on the display, wherein vertical is in the direction of gravity and horizontal is perpendicular to the direction of gravity, wherein the program causes the processor to provide on the display a projected wheel path that is determined as a function of both the actual horizontal wheel position and the vertical position of the at least one of said multiple wheels, and wherein the projected wheel path is determined as a function of a difference between the steering angle and the angle of the at least one of said multiple wheels determined by the program as a function of the vertical position of the at least one of said multiple wheels.

8. The vehicle of claim 1 wherein the suspension sensor is a first suspension sensor responsive to movement of a first one of the suspension components that is associated with a first wheel of the multiple wheels, and wherein the vehicle includes a second suspension sensor that is coupled to a second one of the suspension components that is associated with a second wheel of the multiple wheels that is horizontally spaced apart from the first wheel, and wherein the program causes the processor to provide on the display graphics representative of the position of both the first wheel and the second wheel based at least in part upon the actual horizontal position of the first wheel and second wheel.

9. The vehicle of claim 8 wherein the camera is a forward facing camera having a view of the terrain to be traversed by the vehicle when traveling in a forward direction, and wherein the first wheel and second wheel are front wheels of the vehicle.

10. The vehicle of claim 8 wherein the camera is a rearward facing camera having a view of the terrain to be traversed by the vehicle when traveling in a reverse direction, and wherein the first wheel and second wheel are rear wheels of the vehicle.

11. The vehicle of claim 4 wherein the suspension sensor is responsive to movement of the axle caused by movement of the wheels coupled to the axle, and wherein the actual horizontal position of the wheels coupled to the axle is determined as a function of the vertical position of the axle and of an angle of axle indicative of the vertical position of the wheels coupled to the axle.

12. A method of determining wheel position in a vehicle, comprising the steps of:
   a) determining at least one of a height of: 1) a suspension component associated with at least one wheel of the vehicle, or 2) the at least one wheel of the vehicle;
   b) determining the horizontal position of the at least one wheel as a function of a horizontal shift of the at least one wheel that occurs as a result of a change of the height;
   c) determining a steering angle of the vehicle;
   d) calculating a path of the vehicle as a function of the steering angle and either a) the horizontal position of the at least one wheel or 2) the height determined in step a); and
   e) displaying the horizontal position of at least one wheel, or the wheel path or both.

13. The method of claim 12 wherein the vehicle has a pair of front wheels and a pair of rear wheels, and step a) is accomplished by determining a height of suspension components associated with at least one of: a) both front wheels of the vehicle; or b) both rear wheels of the vehicle.

14. The method of claim 13 wherein the height is the height associated with both front wheels.

15. The method of claim 12 wherein step e) is accomplished by displaying a graphic on a display of the vehicle, with the symbol located in a position indicative of the actual position of the at least one wheel.

16. The method of claim 12 wherein step a) is accomplished with a suspension sensor that is responsive to changes in the position of a suspension component.

17. The method of claim 16 wherein step a) is accomplished with a first suspension sensor responsive to changes in position of a first front wheel of the vehicle and with a second suspension sensor responsive to changes in position of a second front wheel of the vehicle.

18. The method of claim 17 wherein the first front wheel and second front wheel are coupled to a solid axle.

19. The method of claim 12 wherein the first front wheel and second front wheel are coupled to a body of the vehicle by independent suspension assemblies.

\* \* \* \* \*